Nov. 25, 1930.  G. A. BIGGS  1,782,498
LINK FOR HYDRAULIC TURBINES
Filed Feb. 13, 1929
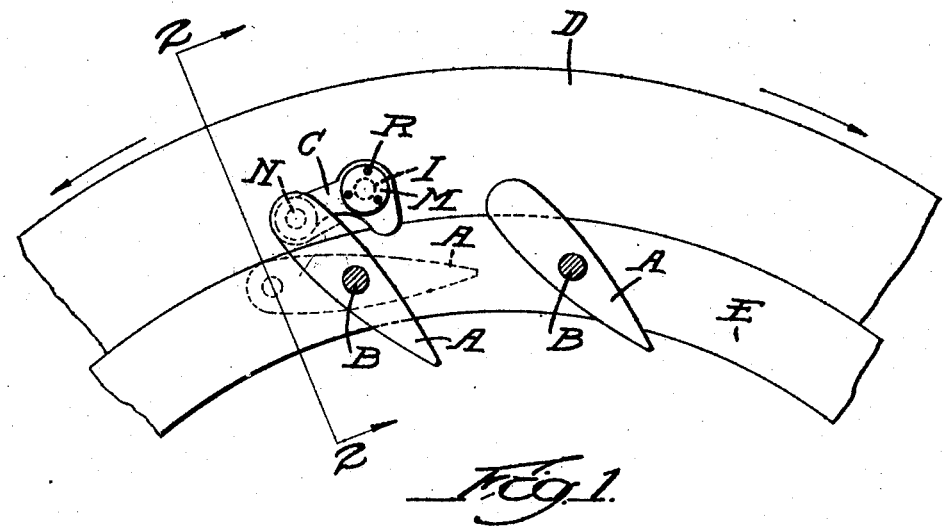
Fig. 1.
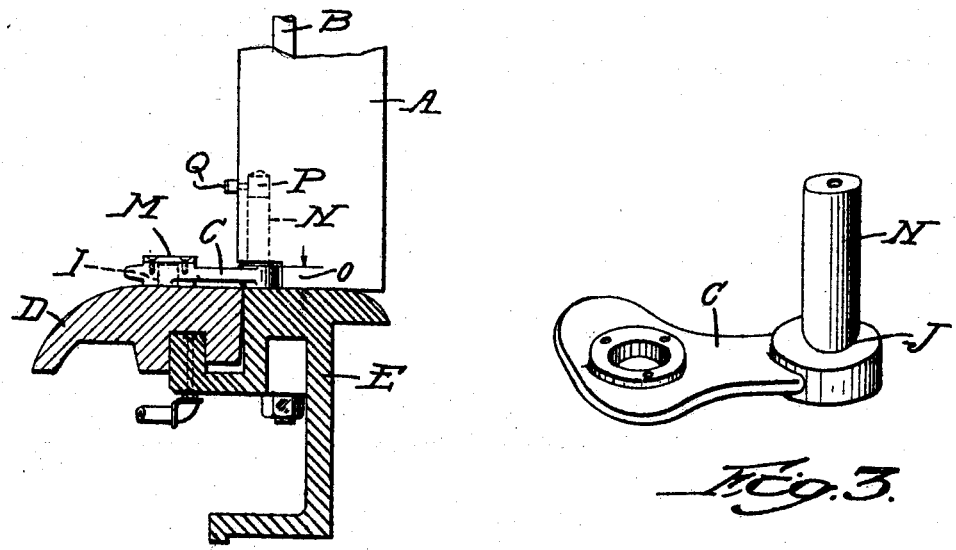
Fig. 2.
Fig. 3.
Inventor:
George A. Biggs
By
Southgate Fay & Hanley
Attorney Patented Nov. 25, 1930

1,782,498

UNITED STATES PATENT OFFICE

GEORGE A. BIGGS, OF ORANGE, MASSACHUSETTS, ASSIGNOR TO RODNEY HUNT MACHINE COMPANY, OF ORANGE, MASSACHUSETTS, A CORPORATION OF MASSACHUSETTS

LINK FOR HYDRAULIC TURBINES

Application filed February 13, 1929. Serial No. 339,716.

This invention relates to the controlling mechanism of hydraulic turbines, rotary pumps, and rotary blowers—particularly regarding that part of the mechanism known as the "link" which connects the swing gate to the gate controlling ring.

The objects of my invention are:—to provide a more durable connection between the gate and the gate controlling ring; to provide a less expensive connection between the gate and gate controlling ring; to provide a gate controlling mechanism that can be operated with a less amount of energy; to provide a link that will not flutter or vibrate in the flowing water; to provide a gate controlling mechanism which will maintain a finer degree of uniformity in the spacing between consecutive gates; to reduce the wear where the link is attached to the gate; to provide a link which can be kept lubricated at the gate connection; and to provide a link which will offer less obstruction to the water entering the space between gates.

Reference is to be had to the accompanying drawings in which

Fig. 1 is a plan of a turbine gate showing the manner of connecting the gate with the controlling ring;

Fig. 2 is a cross section of the lower part of a turbine taken on the line 2—2 of Fig. 1; and Fig. 3 is a perspective view of the link by itself.

In this type of turbine, the turbine shaft has mounted upon it the runner which is surrounded by a gate casing consisting of a crown plate D and a base E. Between the inner surfaces of these members movable gates A are mounted on pivots B. Each gate is connected to the gate operating ring D by a link C.

The gates A each rotate a partial turn on their respective stationary pivots B in order to admit a greater or lesser amount of fluid to the central part of the turbine. The movement of the gates to and fro is accomplished by connecting each gate separately to the ring D which receives its motion to and fro in the direction of the arrows in Fig. 1 from outward means. It will be observed that when the ring D is moved to its rightward limit, the gates are open wide and when moved to its leftward limit, the opening between consecutive gates is reduced.

In existing designs, it has been customary to drive or cast a pin in the gate in place of the stem N with its end projecting downward beyond the end of the gate to receive a link which generally consists of a bar more or less rounded at the ends and with a hole drilled near each end,—one to fit the above mentioned pin and the other to fit a pin I of the gate ring. This kind of construction leaves an open joint corresponding to the position shown in Fig. 3. Abrasive matter carried in suspension in the fluid becomes deposited in this joint and wears both the pin and link, resulting in lost motion, vibration and non-uniform spacing between gates. When the bearing surfaces become thus worn, the gates are more difficult to operate and vibration and wearing take place with increasing rapidity. By my invention I eliminate all these difficulties as will appear.

Referring to Fig. 3 it will be noted that the link C has a stem N which, preferably, forms an integral part of the link itself. The stem N is machine finished to fit the hole in the gate A. It will be noted that there is no open joint at J in which abrasive matter can accumulate,—therefore wear at this point is entirely eliminated. Furthermore, the hole for the pin I is closed at its top, which eliminates any possibility of abrasive substance entering the joint around it.

Abrasive matters seek a lower level in the fluid, consequently there is no tendency for them to work upward into the joint. It will be further noted that the length of the stem N is relatively long. This is so as to provide a long bearing that will more definitely maintain a lateral position for the body of the link relative to the axis of the gate. I consider that the length of the stem from J to the top end should be at least twice the diameter of the stem N. In actual practice I have made this length three to four times the diameter with good results. By making the stem long, its position parallel with the axis of the gate is maintained and all bending tension and compression stresses such as would otherwise be evident are eliminated and the stress reduced to purely shearing, the tendency being to shear the stem N off the body at J. Furthermore, by making the stem N relatively long (within reasonable limits) more bearing surface is provided and consequently wearing is reduced.

By making the stem relatively long, whereby the lateral position of the body of the link is definitely maintained relative to the axis of the stem, the tendency for the body to flutter or vibrate is entirely eliminated, whereas in existing designs when the bearing around the end of the pin becomes worn so as to allow the link to get loose it will flutter or vibrate due to the current of fluid flowing past the link. Furthermore, a link connection of this design is less expensive than where a separate stem is used because it is much easier to fit a stem to a hole for a bearing than to make a pin for satisfactory fit. Also by my invention the cost of drilling an extra hole in the link is eliminated.

Another feature that is desirable is the small height of the body of the link as shown at O, Fig. 2. By this feature the body of the link C can also be made thinner so as not to seriously obstruct the flowing fluid, whereas in existing designs it is necessary to make O greater to provide sufficient bearing area around the pin.

Another valuable feature which is provided by my invention is the possibility of maintaining a lubricated bearing where the stem N fits the hole in the gate. It will be observed in Fig. 2 that the hole extends somewhat above the top of the stem N forming a cavity at P. A plug is provided at Q which may be removed occasionally for the purpose of injecting grease or other lubricating substance into the cavity P. Grease or other lubricating substance forced into this cavity will penetrate the clearance space between the stem and the hole, allowing the stem to work with greater ease.

Furthermore, since grease is of lower specific gravity than water its tendency is to seek a higher elevation when surrounded by water, therefore in this case the tendency is for the grease to stay up in the bearing, keeping it lubricated indefinitely. Also the bearing at I is protected by a cover M over the top which in a similar manner retains the grease and prevents abrasive matter from entering the bearing. The cover M may be attached to the link by means of screws R or the hole I may be covered by any other suitable means.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. A link consisting of a body, and a stem combined with said body to form an integral member, said body having a hole therein with means for covering said hole, for the purpose set forth.

2. The combination with an oscillatable gate for a turbine, of an operating link therefor having a long vertical upwardly extending integral stem, the gate having a vertical hole in the bottom for said stem, whereby the bearing surface is comparatively near the center of the gate, vertically, to reduce vibration and fluttering.

3. The combination with an oscillatable gate for a turbine, of an operating link therefor having a long vertical upwardly extending integral stem, the gate having a vertical hole in the bottom for said stem, whereby the bearing surface is comparatively near the center of the gate, vertically, to reduce vibration and fluttering, said link having an enlarged portion at the bottom of the stem having a flat imperforated top to receive the bottom of the gate, for the purpose described.

4. The combination with an oscillatable gate for a turbine, of an operating link therefor having a long vertical upwardly extending integral stem, the gate having a vertical hole in the bottom for said stem, whereby the bearing surface is comparatively near the center of the gate, vertically, to reduce vibration and fluttering, each gate having a hole in the bottom for receiving the stem with a close fit, said hole being longer than the stem, and means for introducing a lubricant into the hole above the top of the stem.

In testimony whereof I have hereunto affixed my signature.

GEORGE A. BIGGS.